April 5, 1966  J. R. LAYMAN  3,244,027
FINAL DRIVE FOR MOTOR VEHICLES
Filed Nov. 8, 1963  2 Sheets-Sheet 1

Inventor
John R. Layman
By Charles E. Schwab
Attorney

April 5, 1966 J. R. LAYMAN 3,244,027
FINAL DRIVE FOR MOTOR VEHICLES

Filed Nov. 8, 1963 2 Sheets-Sheet 2

Inventor
John R. Layman
By Charles T Schwab
Attorney 3,244,027
FINAL DRIVE FOR MOTOR VEHICLES
John R. Layman, Chatham, Ill., assignor to Allis-Chalmers Manufacturing Company, Milwaukee, Wis.
Filed Nov. 8, 1963, Ser. No. 322,308
8 Claims. (Cl. 74—801)

This invention relates to a final drive for a motor vehicle and particularly relates to an improved final drive for traction vehicles such as crawler tractors.

It is an object of this invention to provide a final drive structure which is comprised of a plurality of easily manufactured parts including a shaft segment, a sleeve segment, and a hub-segment.

It is a further object of this invention to provide a final drive structure of the hereinbefore outlined type wherein the shaft segment is supported at its inner end on an inner wall of the housing and the sleeve segment is supported by an outer wall of the final drive housing and is connected to speed reduction unit.

It is a further object of this invention to provide a final drive for a motor vehicle having a driving pinion meshing with a reduction gear of a gear cluster member which also includes a floating sun-gear of a planetary reduction gear set and wherein the planet gears and driving pinion have spur teeth which taper from a central portion to reduced end portions to compensate for the floating action of the sun-gear.

It is a further object of this invention to provide a final drive employing a planetary speed reduction set having a floating sun-gear secured for rotation with a reduction gear driven by a pinion and wherein the sun and reduction gears are supported on a self-aligning bearing disposed in the central plane of the reduction gear.

It is a further object of this invention to provide a final drive for a motor vehicle which utilizes a minimum of bearings, is comprised of parts of relatively simple construction and is easily manufactured and serviced.

These and other objects and advantages of this invention will be apparent from the following description when read in conjunction with the drawings in which.

Figure 1:
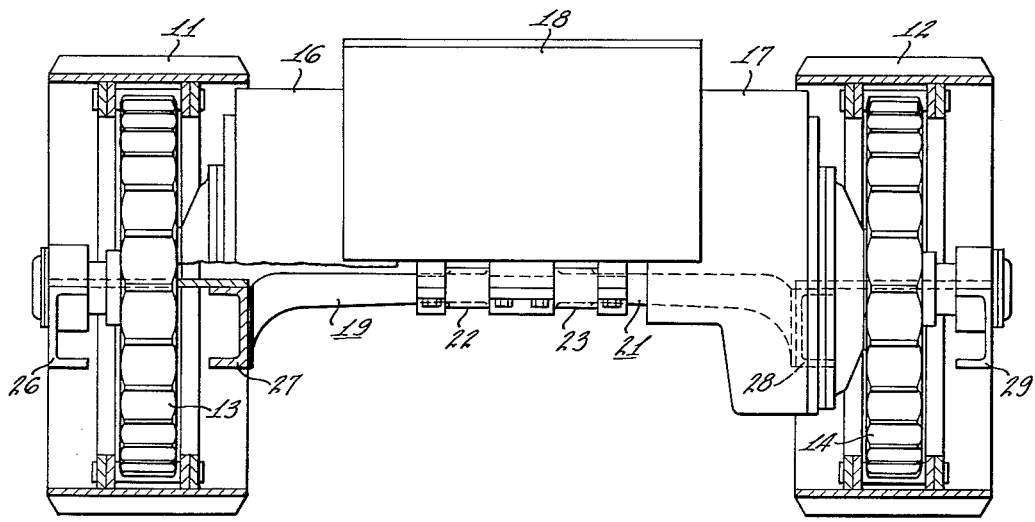
FIG. 1 is a rear view of a crawler tractor with portions removed to reveal the drive sprockets and undercarriage.

Referring to FIG. 1, which is a rear view of the crawler tractor, the endless track belts 11, 12 are driven by sprockets 13, 14 which in turn are driven by an engine, not shown, through gearing including final drive gearing located in the final drive housings 16, 17 connected on opposite sides of a rear transmission housing 18. The undercarriage of the crawler tractor includes a pair of truck frames 19, 21 having inner legs 22, 23 pivotally connected to the underside of the rear transmission housing 18 in a conventional manner. The truck frame 19 includes a pair of channels 26, 27 to which truck rollers, not shown, are secured for supporting the endless track 11. Likewise, the truck frame 21 includes channels 28, 29 which support truck rollers, not shown, for supporting the endless track 12.

Figure 2:
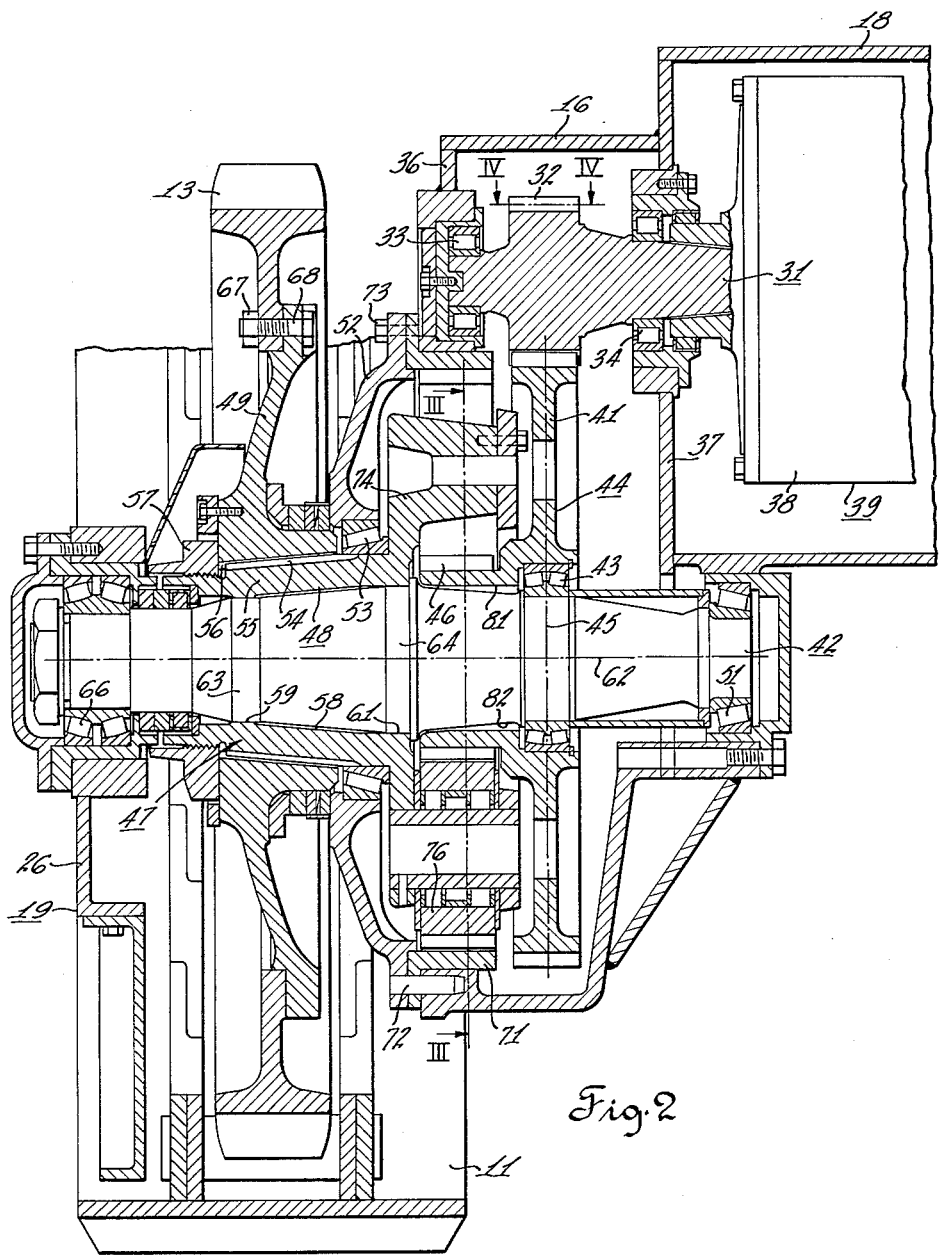
FIG. 2 is a section view of a final drive incorporating my invention.

Referring to FIG. 2 the final drive housing 16 is welded to the rear transmission housing and is an integral part thereof. A driving pinion structure 31 is mounted by antifriction bearings 33, 34 in transversely spaced and vertically disposed walls 36, 37 of the final drive housing 16. The pinion structure 31 is driven by the drum 38 of a steering clutch 39 within the housing 18. A large reduction gear 41 meshes with a pinion gear 32 formed on pinion structure 31 and the gear 41 is rotatably mounted on a shaft segment 42 by a self-aligning bearing 43 disposed in the central plane 45 of the gear 41. The reduction gear 41 is a part of a cluster gear member 44 which also includes a sun-gear 46 spaced transversely from gear 41.

The shaft segment 42 is a part of a final drive structure 47 which structure also includes a sleeve segment 48 and a hub segment 49 which is splined to the sleeve segment. The inner end of the shaft segment 42 is mounted on the inner wall 37 by an antifriction bearing 51. The sleeve segment 48 which is rotatably mounted in the cap portion 52 of the outer wall 36 by an antifriction bearing 53, has tapered splines 54 on its driving portion 55 which cooperate with complementary tapered splines 56 on the hub segment 49. The hub segment 49 is held in place on the driving portion 55 of the sleeve segment 48 by a suitable nut 57.

The sleeve segment 48 has an interior annular opening defined by an annular wall 58 which presents a pair of annular thrust transmitting surfaces 59, 61 which are cylindrical, of different diameters, and coaxial with the axis 62 of shaft segment 42. A pair of radially outward facing and axially spaced cylindrical surfaces 63, 64 are formed on the shaft segment 42 in vertical thrust transmitting relation to the surfaces 59, 61 on the sleeve segment. The cylindrical surfaces have a snug fit.

The outer end of the shaft segment 42 rotatably supports the outer channel member 26 of the truck frame 19 through a bearing 66. A driving sprocket 13 is secured to the hub segment 49 by a plurality of nuts 67 and bolts 68.

Figure 3:
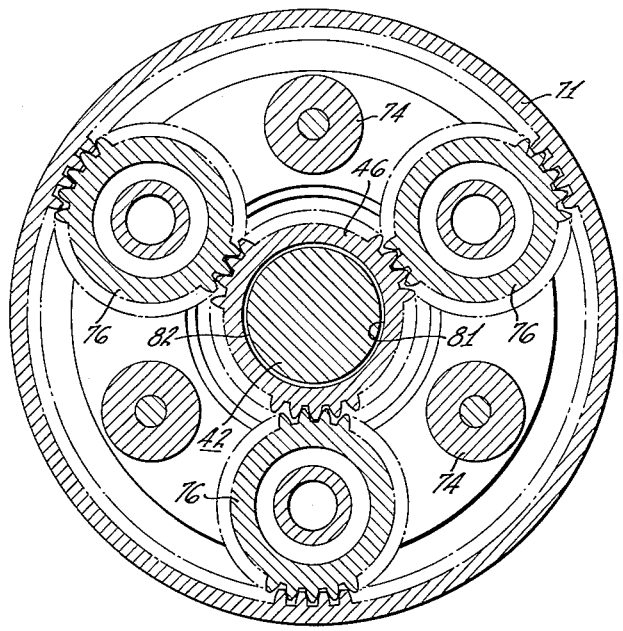
FIG. 3 is a section view taken along the line III—III in FIG. 2.
Figure 4:
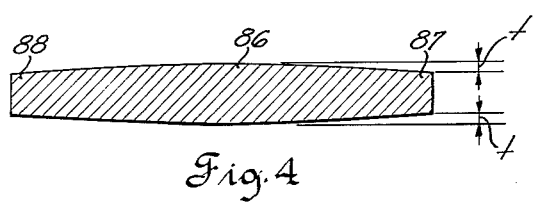
FIG. 4 is a section view taken along the line IV—IV in FIG. 2.

The gear means interposed between the driving pinion 31 and the inner end of the sleeve segment 48 includes a planetary gear set and the reduction gear 41. The planetary gear set includes an internal ring gear 71 secured to the outer wall 36 by guide pins 72 and cap screws 73, only one each of which are shown. The inner portion of sleeve segment 48 constitutes a planet carrier 74 in which three planet gears 76 are rotatably mounted in meshing relation with the internal ring gear 71 and with the sun-gear 46. The relationship of gears 71, 76 and 46 is also shown in FIG. 3. As shown in FIGS. 2 and 3, the inner diameter 81 of sun-gear 46 is larger than the confronting diameter 82 of shaft segment 42, thereby permitting the sun-gear to float. This insures equal distribution of load on the planet gears 76 and avoids the necessity of extremely close and costly tolerances. In order to permit the sun-gear to shift slightly to equally distribute the load on the planet gears, the cluster member 44 may tilt slightly from its normally right angle relationship with the axis 62, this being permitted by the self-aligning bearing 43. The shifting of the cluster 44 also changes the relative position of the teeth of gears 46 and 41 with the mating gears 76 and 32 and in order to prevent excessive tooth loading, the teeth of the gear 32 and the planet gears 76 are beveled or tapered, as illustrated in FIG. 4, from their central portion 86 to their reduced thickness end portions 87, 88. The reduction in width of the ends of the tooth is represented by the amount of material removed from each face of the tooth. The tooth section illustrated in FIG. 4 is exaggerated as to taper for the purposes of illustration.

From the foregoing description it is apparent that my invention provides a final drive for a motor vehicle which is relatively easy to manufacture, and service, and which will give excellent performance and long life by virtue of the floating sun-gear arrangement. The floating sun-gear 46 and tapered teeth of pinion gear 32 and planet gears 76 insure equal tooth loading and long gear life. Further, I have provided a novel multiple part final drive structure which includes a shaft segment which does not carry torque but rather carries only vertical loading and also a sleeve segment and hub segment adapted for connection to traction means, in the form of track 11 through sprocket 13.

The embodiments of the invention in which an exclusive property or privilege is claimed are defined as follows:

1. In combination with a final drive housing having transversely spaced inner and outer vertically disposed walls,
   a driving pinion mounted in said housing for rotation on a first axis,
   a multisegment final drive structure mounted on said housing for rotation on a second axis spaced from said first axis including
      a shaft segment having
         an axially inner end rotatably mounted in said inner wall on said second axis and
         an axially outer end extending through said outer wall,
      a sleeve segment surrounding said shaft segment and rotatably mounted in said outer wall on said said axis, said sleeve segment having
         a driving portion extending through said outer wall,
         an inner portion intermediate said inner and outer walls and
         an annular wall defining an opening coaxial with said second axis and presenting at least one annular thrust transmitting surface in vertical thrust transmitting relation to said shaft segment, and
      a hub segment adapted for connection to traction means and secured to said outer portion of said sleeve segment for rotation therewith and
   gear means disposed between said walls and connecting said pinion in power transmitting relation to said inner portion of said sleeve segment.

2. The structure set forth in claim 1 and further comprising a second annular thrust transmitting surface on said annular wall in axially spaced relation to said one annular thrust transmitting surface and a pair of radially outward facing and axially spaced cylindrical surfaces on said shaft segment in vertical thrust transmitting relation to said one and second thrust transmitting surfaces.

3. The structure set forth in claim 1 wherein said gear means includes a ring gear nonrotatably secured to said outer wall, a planet carrier secured to said inner portion of said sleeve segment, planet pinions on said carrier meshing with said ring gear, a sun-gear meshing with said planet pinions, and a reduction gear meshing with said driving pinion and connected to rotate in unison with said sun-gear.

4. The structure set forth in claim 3 wherein said pinions present spur teeth each of which taper to diminished thickness in opposite axial directions.

5. Final drive gearing for a motor vehicle comprising:
   a housing with transversely spaced and vertically disposed inner and outer walls,
   a pinion gear rotatably supported in said housing on a first transverse axis and having spur teeth each of which tapers from a central portion to reduced thickness end portions,
   an internal ring gear nonrotatably secured to said outer wall on a second axis parallel to said first axis and spaced transversely from said pinion gear,
   a final drive structure rotatably supported on said walls having a part extending through said outer wall and adapted for connection to traction means,
   a plurality of planet gears rotatably mounted on said final drive structure in meshing relation with said internal ring gear and having spur teeth each of which tapers from a central portion to reduced thickness end portions,
   a cluster gear member having
      a sun-gear meshing with said planet gears and
      a reduction gear spaced transversely from said sun-gear and meshing with said pinion gear and
   a sel-aligning bearing rotatably supporting said cluster gear member on said final drive structure, said bearing lying in the central plane of said reduction gear.

6. The structure set forth in claim 5 wherein said final drive structure includes a shaft segment having an inner end supported on said inner wall for rotation on said second axis and wherein said part is a sleeve segment of said final drive structure rotatably supported in said outer wall and connected in vertical thrust transmitting relation to said shaft segment, said sleeve segment rotatably mounting said planet gears.

7. The structure set forth in claim 6 wherein said final drive structure includes a hub segment adapted for connection to traction means and secured to said sleeve segment for rotation therewith.

8. The structure set forth in claim 7 and further comprising a sprocket secured to said hub segment adapted to drive an endless track.

References Cited by the Examiner
UNITED STATES PATENTS
2,939,346    6/1960    McCarthy _____ 74—801

DAVID J. WILLIAMOWSKY, *Primary Examiner.*

J. R. BENEFIEL, *Assistant Examiner.*